United States Patent [19]

Nagao et al.

[11] Patent Number: 5,105,302
[45] Date of Patent: Apr. 14, 1992

[54] SPATIAL LIGHT MODULATOR

[75] Inventors: Yasuyuki Nagao, Tokyo; Yoshinori Mimura, Wako, both of Japan

[73] Assignee: Kokusai Denshin Denwa Kabushiki Kaisha, Tokyo, Japan

[21] Appl. No.: 484,045

[22] Filed: Feb. 22, 1990

[30] Foreign Application Priority Data

Feb. 23, 1989 [JP] Japan .................. 1-41616
Apr. 19, 1989 [JP] Japan .................. 1-97473

[51] Int. Cl.$^5$ .............. G02F 1/03; G02F 1/07
[52] U.S. Cl. .................. 359/245; 359/246; 359/250
[58] Field of Search ............ 350/388, 390, 355

[56] References Cited

U.S. PATENT DOCUMENTS 3,566,130 2/1971 Woburn et al. ............ 350/388

FOREIGN PATENT DOCUMENTS 63-208022 8/1988 Japan ................. 350/388

Primary Examiner—Rolf Hille
Assistant Examiner—Robert P. Limanek
Attorney, Agent, or Firm—Emmanuel K. Lobato; Robert E. Burns

[57] ABSTRACT

A spatial light modulator is disclosed, in which a low dark resistance single-crystal plate is used which is formed of $Bi_{12}MO_{20}$ (where M is Si, Ge or Ti) or similar type crystal, doped with phosphorus (P) in the range of $0.03 \leq P \leq 0.2$ in atomic percentage to provide a dark resistivity far lower than that of an undoped crystal, and a high dark resistance layer, which is of the same crystal structure as that of the single-crystal plate and lattice-matched therewith and has photoconductivity, electro-optic effect and a high dark resistivity, is provided on the light incident side of the single-crystal plate. A tapered low dark resistance single-crystal plate may be used which is formed of $Bi_{12}MO_{20}$ (where M=Si, Ge, or Ti) or similar sillenite type crystal, doped with phosphorus (P) in the range of $0.03 \leq P \leq 0.2$ in atomic percentage to provide a dark resistivity far lower than that of a phosphorus-free crystal, and a high dark resistance layer, which has the same crystal structure as that of the tapered single-crystal plate and produces photoconductivity and the electro-optic effect and a high dark resistivity, is provided on the light incident side of the tapered single-crystal plate, whereby the image write sensitivity and resolution can be made uniform throughout the device.

10 Claims, 5 Drawing Sheets

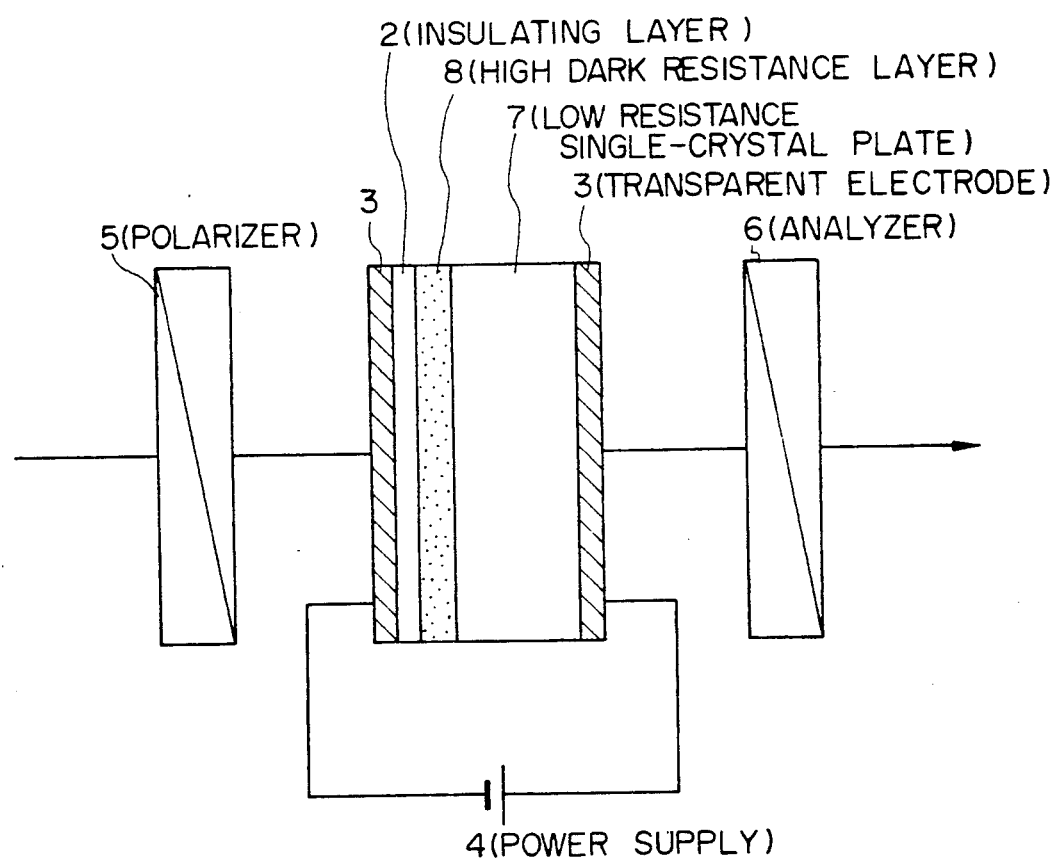

SPATIAL LIGHT MODULATOR

BACKGROUND OF THE INVENTION

The present invention relates to improvement in an optical image device which performs the conversion of an incoherent image to a coherent image, spatial frequency filtering, optical logic operations, etc. through utilization of photoconductivity and the electro-optic effect a crystal having a sillenite type crystal structure.

From the viewpoint of improving the resolution of the device, as described above, it is desirable to reduce the thickness of a single-crystal plate, but it is difficult to use the plate less than 100 μm thick, because of a requirement of the physical strength necessary for the fabrication and handling of the device. Furthermore, it is desirable that the written image can be erased solely by voltage control, because this permits simplification of peripheral optical systems for applications of the devices, but the conventional device requires, for erasure, irradiation of uniform by blue light as well as voltage control.

SUMMARY OF THE INVENTION

It is therefore an object of the present invention to provide a spatial light modulator which is excellent in resolution and permits erasure of a written image through voltage control alone.

Another object of the present invention to provide a spatial light modulator which is excellent in the in-plane uniformity of the image write sensitivity and in resolution and permits erasure of an image through voltage control alone.

To attain the above object, a spatial light modulator of the present invention, which performs recording and read out of an optical image through utilization of photoconductivity and the electro-optic effect of a single-crystal of a sillenite type crystal structure, is characterized by: a low dark resistance single-crystal plate which has a smaller dark resistivity reduced by impurity doping than that of the undoped one; a high dark resistance layer of a high dark resistivity, provided on the light incident side of the low dark resistance single-crystal plate, having a crystal structure of the same kind as that of the single-crystal plate and lattice-matched therewith; an insulating layer provided on the other side of the high dark resistance layer; and transparent electrodes provided on the other sides of the low dark resistance single-crystal plate and the insulating layer.

To attain the above object, a spacial light modulator of the present invention, which performs recording and read out of an optical image through utilization of photoconductivity and the electro-optic effect of a single-crystal of a sillenite crystal structure, is provided with:

a low dark resistance single-crystal plate of a smaller dark resistivity reduced by impurity doping than that of the undoped one and having a tapered configuration; a high dark resistance layer of a high dark resistivity, provided by a crystal growth technique to a uniform thickness on the light incident side of the low dark resistance single-crystal plate, having a crystal structure of the same kind as that of the single-crystal plate and lattice-matched therewith; an insulating layer provided on the high dark resistance layer at the side opposite from the single-crystal plate; and transparent electrodes provided for applying voltage to the low dark resistance single-crystal plate and the high dark resistance layer.

BRIEF DESCRIPTION OF THE DRAWINGS

The present invention will be described in detail below in comparison with prior art with reference to accompanying drawings, in which:

FIG. 2 is a sectional view illustrating an example of the structure of the spatial light modulator of the present invention;

DETAILED DESCRIPTION

To make difference between prior art and the present invention clear, examples of prior art will first be described.

Figure 1A:
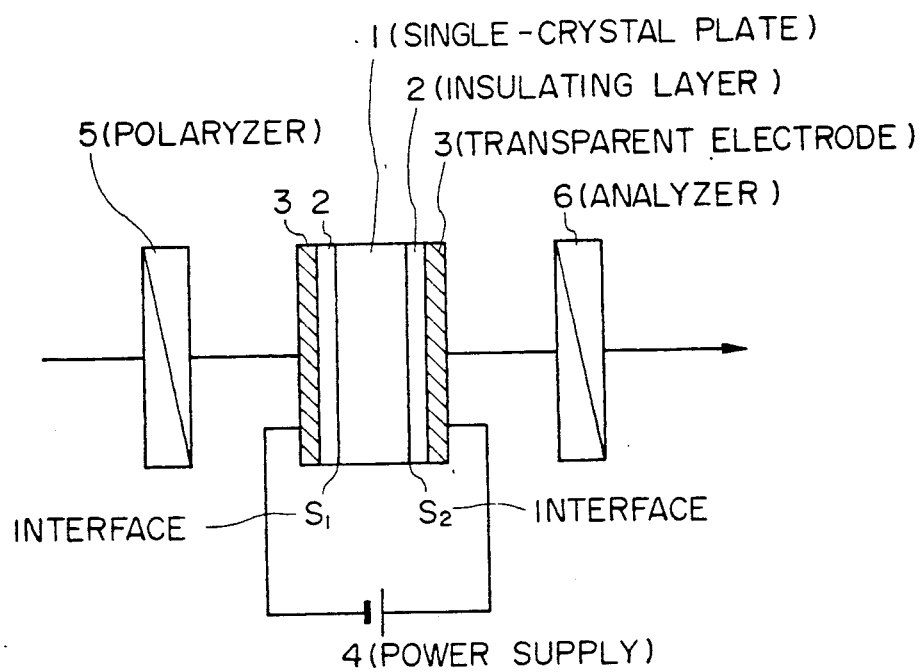
FIGS. 1A and 1B are sectional views showing examples of structures of conventional symmetric and asymmetric devices.
Figure 1B:
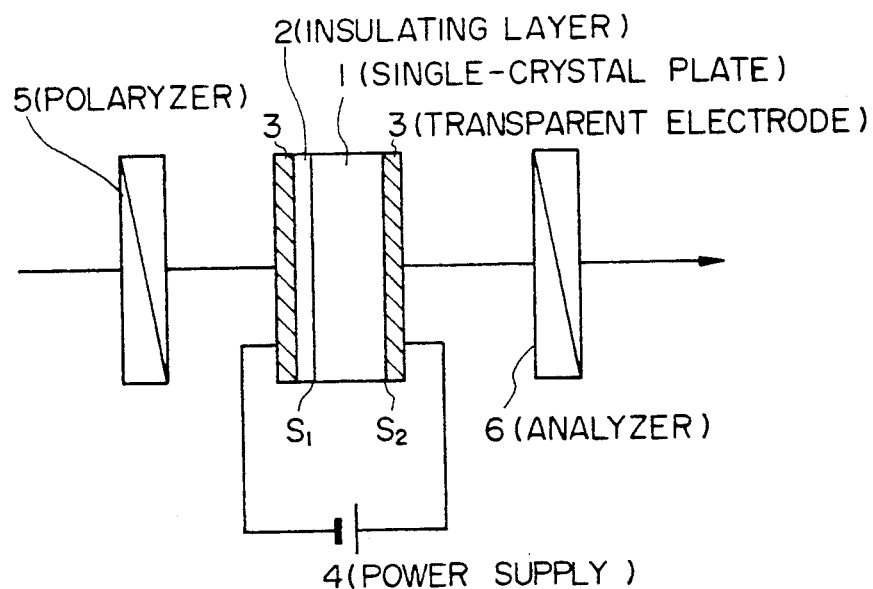

There has been known a device made up of, for example, a single-crystal plate 1 of a sillenite type crystal structure which has photoconductivity and an electro-optic effect, such as $Bi_{12}MO_{20}$ (where M is Si, Ge, or Ti), an insulating layer 2 provided on at least one side of the single-crystal plate 1, and transparent electrodes 3 provided on the outer sides of the single-crystal plate 1 and the insulating layer 3, for applying thereto electric fields, as shown in FIG. 1. This device performs recording, reading-out and erasing of an optical image and is used for an image conversion from incoherent to coherent light, spatial frequency filtering, optical logical operations, etc.

The principle of operation of this device is as follows:

The operation starts with the application of voltage across the transparent electrodes 3. Forming an image of blue light on the single-crystal plate 1. In this state, electrons and holes excited in correspondence to the intensity of light are separated by an electric field antiparallel to the incident light, since the single-crystal plate 1 has photoconductivity. In the symmetric device shown in FIG. 1A positive and negative charges are distributed corresponding to the image in the vicinities of interfaces 1 and 2 between the single-crystal plate 1 and the insulating layer 2, respectively, whereas in the asymmetric device shown in FIG. 1B only positive charges are distributed corresponding to the image in the vicinity of the interface 1. That is, a potential distribution corresponding to the image is written into the single-crystal plate 1.

For read out the image thus written, red light which does not contribute to the photoconductivity of the single-crystal plate 1 is used and its electro-optic effect is utilized. Since the single-crystal plate 1 has the electro-optic effect, a refractive index distribution is induced by the potential distribution therein. Therefore, when the single-crystal plate 1 is irradiated with uniform red light linearly polarized by a polarizer 5, the transmitted light can be converted to an intensity modulated light corresponding to the refractive index distribution in the single-crystal plate 1 by an analyzer 6;

thus, the image is read out. By using incoherent light for image input and laser light or similar coherent light for readout, an incoherent image can be converted into a coherent image in real time.

Furthermore, the erasure operation can be quickened by applying the voltage of an opposite polarity to that when the image was written across the transparent electrodes 3. Since the electric field component developed by the voltage application is in the same direction as that of the electric field developed by the positive charge distribution, the electron injection from the low dark resistance single-crystal plate 7 is enhanced. In this case, a uniform negative charge distribution which develops an equilibrated electric field with the applied voltage formed in the vicinity of the interface between the insulating layer 2 and the high dark resistance layer 8 after the erasure operation.

Next, a description will be given of the principle of erasure of the thus written image. The distribution of charges formed corresponding to the input image is considered to be trapped electrons or holes at the trap level, and even in the presence of an electric field reverse from that during the write, the trapped charges do not easily migrate. Then, the power supply 4 is disconnected at first, causing a short between the transparent electrodes 3. Irradiating the single-crystal plate 1 with uniform blue light. Then, electrons and holes, including the trapped ones, are excited and migrate in a manner to relax the internal electric field caused by the charge distribution and neutralize this charge distribution. As a result, the potential distribution in the single-crystal plate 1 is returned to its uniform initial state.

As will be seen from the above principles of operation, the resolution of the device does not depend directly on the distribution of charges developed corresponding to the image in the vicinity of the interface between the single-crystal plate 1 and the insulating layer 2, but it is determined by the potential distribution which is created by the distribution of charges inside the single-crystal plate 1. In consequence, if the single-crystal plate 1 is thin, the potential distribution in the direction perpendicular to the direction of its thickness spreads less and the resolution of the device is high. Conversely, if the single-crystal plate 1 is thick, the spread of the potential distribution increases and the resolution of the device becomes poor. The relationship between the resolution of the device and the thickness of the single-crystal plate is discussed in detail in J. Opt. Soc. Am. A, Vol. 1, No. 6, (1984), pp. 635, for instance.

EMBODIMENT

With reference to the accompanying drawings, the present invention will be described in detail. In the following description the parts corresponding to those in the prior art example of FIG. 1 are identified by the same reference numerals and no description will be given of them.

FIG. 2 schematically illustrates the structure of the spatial light modulator of the present invention, which includes a low dark resistance single-crystal plate 7 of a sillenite type crystal structure, with its dark resistivity substantially reduced by the addition of phosphorus (P), and a high dark resistance layer 8 grown epitaxially on the light incident side of the low dark resistance single-crystal plate 7, lattice matched therewith and having photoconductivity, electro-optic effect and a high dark resistivity.

That is, the present invention employs a structure in which the conventional single-crystal plate 1 of high dark resistivity is replaced with the low dark resistance single-crystal plate 7 of low dark resistivity and the high dark resistance layer 8 is newly provided. Incidentally, the same applicant as that of this application has already filed a patent application (Japanese Patent Laying-open No. 208022/88) on a structure in which an epitaxial growth layer of a large photoconductivity is provided on the light incident side of the single-crystal plate 1 for obtaining an image of good contrast with a small amount of exposure. The image device proposed in the above application (Japanese Patent Laying-open No. 208022/88) and the image device of the present invention differ in that the dark resistivity of the single-crystal plate is high in the former but low in the latter. The low dark resistance single-crystal plate 7 for use in the present invention is formed so that it has a smaller dark resistivity reduced by impurity doping than that of the undoped one, whereas the single-crystal plate of the conventional image element (Japanese Patent Laying-open No. 208022/88) is formed of a high dark resistivity material.

According to the present invention, since the low dark resistance single-crystal plate 7 and the high dark resistance layer 8 are combined, the low dark resistance single-crystal plate 7 is far lower in resistivity than the insulating layer 2 and the high dark resistance layer 8 and voltage applied across the transparent electrodes 3 from the power supply 4 is divided mostly by the insulating layer 2 and the high dark resistance layer 8. In other words, the low dark resistance single-crystal plate 7 serves as an electrode transparent to red light for readout operation and the high dark resistance layer 8 performs the same function as that of the single-crystal plate 1 in the prior art example. Consequently, in the thin film type optical image device of the present invention, its required physical strength is secured by forming the low dark resistance single-crystal plate 7 thick but resolution can be improved by forming the high dark resistance layer 8 less than 100 μm thick.

A description will be given first of the reason for which an image written can be erased by mere voltage control in the present invention employing the low dark resistance single-crystal plate 7.

The low dark resistance single-crystal plate 7 and the high dark resistance layer 8 are both formed of crystals of the same crystal structure, and hence have the same band structure concerning electric conduction. By disconnecting the power supply 4 to short the transparent electrodes 3 electrons are easily injected into the high dark resistance layer 8 from the low dark resistance single-crystal plate 7 of a high free carrier concentration, since the direction of the electric field which was developed by the distribution of positive charges formed corresponding to the image in the vicinity of the interface between the high dark resistance layer 8 and the insulating layer 2 is applied to that when the image was written, thereby neutralizing the positive charge distribution to provide a uniform electric field distribution. That is, the written image can be erased by voltage control alone without irradiation of uniform red light as is needed in the conventional device.

Next, a description will be given of a method for the manufacture of the spatial light modulator of the present invention, including the low dark resistance single-crystal plate 7.

Figure 3:
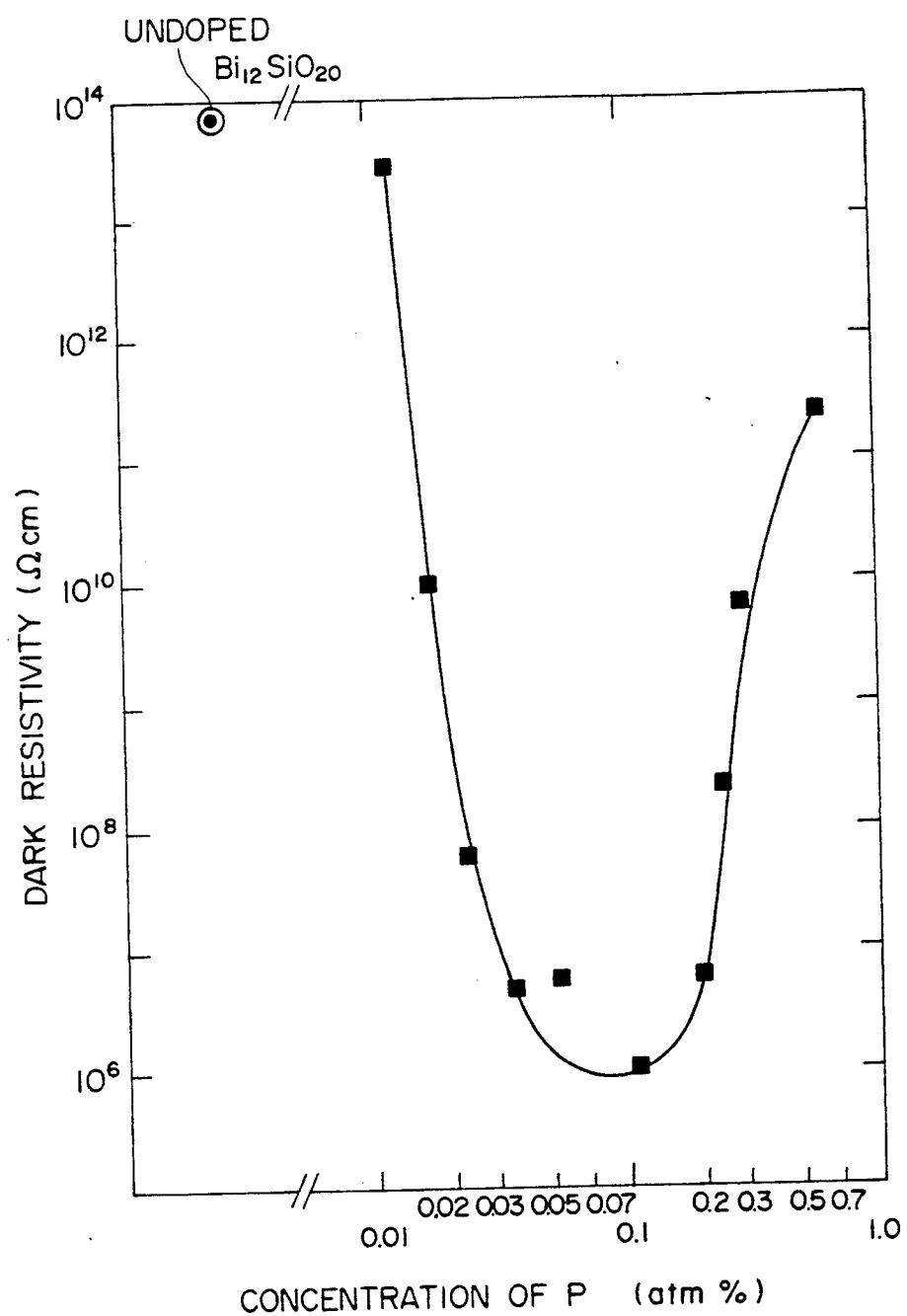
FIG. 3 is a characteristic diagram showing the phosphorus (P) concentration and the dark resistivity of a low dark resistance single-crystal plate for use in the present invention.

Heretofore there has not been known the low dark resistivity crystal of the sillenite type structure which can be used for the low dark resistance single-crystal plate 7 in the present invention. The inventors of this application have studied various methods for decreasing the dark resistivity of the sillenite type crystal and, as a result of their studies, found that the addition of a small amount of phosphorus (P) would afford substantial reduction of the dark resistivity. FIG. 3 is a characteristic diagram showing the concentration of phosphorus (P) in the crystal and the dark resistivity of the low dark resistance single-crystal plate 7 according to the present invention. The values shown are the results of experiments in which $Bi_2O_3$, $BiPO_4$ and $SiO_2$ of 99.999% purity were used and phosphorus-doped single crystals of $Bi_{12}SiO_{20}$ were grown by the Czochralski method, using a 50 mm$\phi$ platinum (Pt) crucible.

As is evident from the experimental results shown in FIG. 3, the dark resistivity of the $Bi_{12}SiO_{20}$ single crystals is less than $1/10^7$ times that of an undoped crystal in the range of phosphorus (P) concentrations between 0.03 to 0.2 atm % (0.99 to 6.6 mol %). The $Bi_{12}SiO_{20}$ single crystals containing the phosphorus (P) in the above concentration range can be employed for the low dark resistance single-crystal plate 7 in the present invention. Such a phosphorus-doped single crystal is sliced to a thickness of 300 to 500 $\mu$m for use as the low dark resistance single-crystal plate 7. An undoped $Bi_{12}SiO_{20}$ epitaxial layer is grown, as the high dark resistance layer 8, to a thickness of about 10 $\mu$m on the low dark resistance single-crystal plate 7 by an epitaxial growth method which grows a bismuth-containing oxide thin film, using bismuth (Bi) or alkylated bismuth as a source material therefor. Incidentally, the applicant of this application has already filed a patent application on this epitaxial growth method (Japanese Patent Kokai No. 17099/87 see U.S. Pat. No. 4,702,791 issued 10/27/87). Further, an insulating layer as of polyparaxylylene or mica, or a $TiO_2$-$Bi_2O_3$-$SiO_2$ system insulating film for a high-voltage driven device whose composition is in the ranges of $30 \leq TiO_2 \leq 70$, $10 \leq Bi_2O_3 \leq 40$ and $10 \leq SiO_2 \leq 50$ ($TiO_2 + \frac{1}{2}Bi_2O_3 + SiO_2 = 100$ in molecular percentage) and on which the applicant of this application has already filed a patent application (Japanese Patent Application No. 82834/88), is deposited as the insulating layer 2 on the high dark resistance layer 8. Then ITO films ($In_2O_3$-$SnO_2$ system films) are deposited as the transparent electrodes 3. In this way, the thin film type optical image device of the present invention can be fabricated.

In the above the low dark resistance single-crystal plate 7 and the high resistance layer 8 have been described to be formed of $Bi_{12}SiO_{20}$ but they are not limited specifically thereto and may be formed of other sillenite type crystals such as $Bi_{12}GeO_{20}$ and $Bi_{12}TiO_{20}$. Further, the low dark resistance single-crystal plate 7 and the high dark resistance layer 8 need not always be of exactly the same composition but they may also be formed of materials of the same crystal structure but different in composition.

Moreover, in the fabrication of the low dark resistance single-crystal plate 7 a pentavalent element such as antimony (Sb) or niobium (Nb) may also be used in place of the phosphorus (P).

As described above in detail, according to the present invention, the low dark resistance single-crystal plate 7 is used which is formed of $Bi_{12}MO_{20}$ (where M is Si, Ge, or Ti) similar type crystal, doped with phosphorus (P) in the range of $0.03 \leq P \leq 0.2$ in atomic percentage ($0.99 \leq P \leq 6.6$ in molecular percentage) to provide a dark resistivity far lower than that of an undoped crystal, and the high dark resistance layer 8, which is of the same crystal structure as that of the single-crystal plate 7 and lattice-matched therewith and has the photoconductivity, electro-optic effect and a high dark resistivity, is provided on the light incident side of the single-crystal plate 7. This structure affords substantial reduction of the effective device thickness, by which it is possible to obtain a read-out image of high resolution and hence of good quality and to erase a written image by voltage control alone.

The use of $Bi_{12}MO_{20}$ (where M is Si, Ge, or Ti) for the high dark resistance layer 8 provides the photoconductivity, the electro-optic effect and the high dark resistivity in combination.

By forming the low dark resistance single-crystal plate 7 of a crystal of $Bi_{12}MO_{20}$ doped with pentavalent elements, it is possible to implement a low dark resistance single-crystal plate of the sillenite type crystal structure.

By using the pentavalent element selected from the group consisting of phosphorus (P), antimony (Sb) and niobium (Nb), the resistivity of the sillenite type single-crystal plate can be reduced.

By doping $Bi_{12}MO_{20}$ with phosphorus (P) in the concentration range of between 0.03 and 0.2 atm % (0.99 and 6.6 mol %), it is possible to obtain the low dark resistance single-crystal plate 7 of the sillenite type crystal structure with a markedly reduced dark resistivity.

Consequently, the spatial light modulator of the present invention is of very wide application to the field of optical information processing such as the conversion of an incoherent to a coherent image, spatial frequency filtering, or optical logical operations. Hence, the present invention is of great utility in practical use.

In the following, another type of spatial light modulator using coherent readout light will be described.

Figure 4:
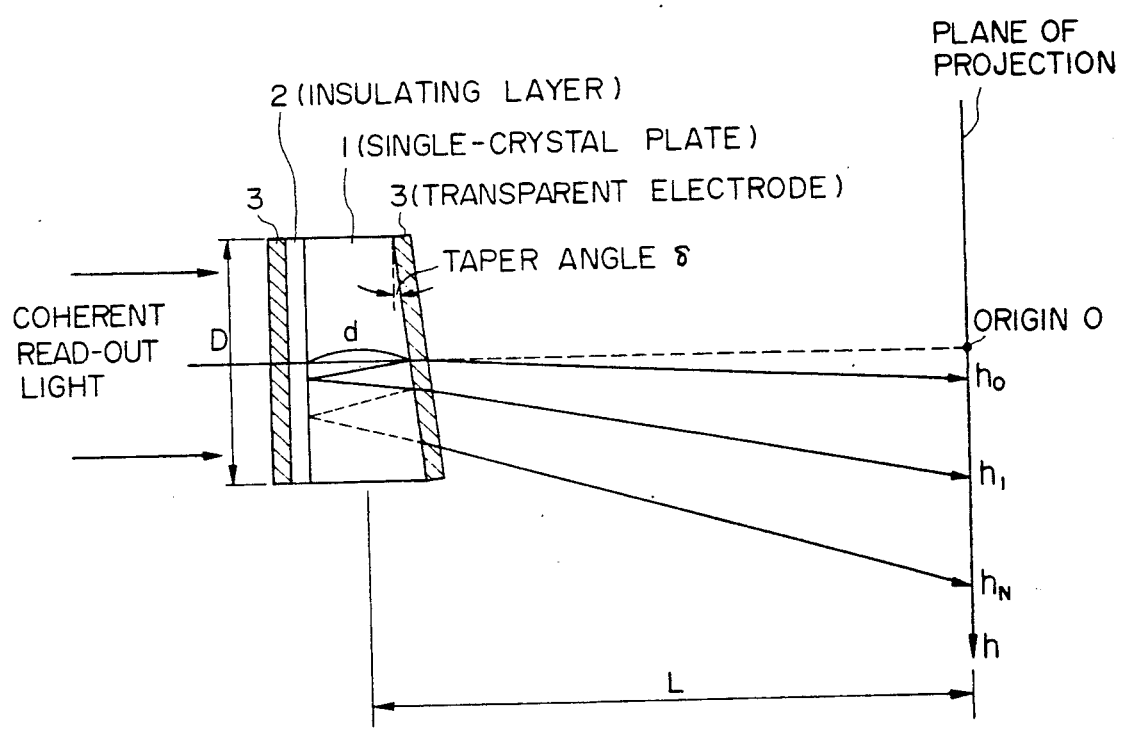
FIG. 4 is a diagram showing a conventional optical image device employing a single-crystal plate 1 of a tapered configuration.

In the case of using coherent light for readout, multiple reflection which occurs in the single-crystal plate 1 between its light incident and emerging end faces produces interference fringes, degrading the quality of the read-out image. FIG. 4 shows the construction of a conventional spatial light modulator intended for removing the interference fringes, in which the emerging end face of the single-crystal plate 1 has a taper angle. Letting the intersection of the optical axis of readout light with the plane of projection be represented by the origin O, the positions, on the plane of projection, of a directly-transmitted image (a zero-order image) and an image reflected N times (i.e. N-order image) between the light incident and emerging end faces of the single-crystal plate 1 can be expressed as the distance $h_N$ from the origin O as follows:

$$h_N = L \cdot \tan[[\arc \sin\{n \cdot \sin(2N+1) \cdot \delta)\}] - \delta] \qquad (1)$$

where n is the refractive index of the single-crystal plate 1, $\delta$ is the taper angle, and L is the distance between the single-crystal plate 1 and the plane of projection. It is assumed, in this instance, that the center thickness d of the single-crystal plate 1 is sufficiently smaller than the above distance L.

Letting the effective diameter be represented by D and the distances between the origin O and the directly-transmitted image (the zero-order image) and the first-order image be represented by $h_0$ and $h_1$, respectively, if $$h_1 - h_0 > D \tag{2}$$

then the multiple-reflected images do not overlap the directly-transmitted image, and consequently, no interference fringes are produced. For example, in the case where n = 2.55 ($Bi_{12}SiO_{20}$), D = 35 mm and L = f = 1,000 mm (the focal length of a lens), the taper angle δ is given by $$\delta > 0.38° \tag{3}$$

from expressions (1) and (2). Consequently, when the center thickness d of the single-crystal plate 1 is 300 μm as usual, the thinnest portion becomes 200 μm and the thickest portion 400 μm.

As described above, in the case of using coherent light for readout, the single-crystal plate 1 of the conventional device has different thicknesses depending on the position in the device, and consequently, the voltage distributed to the single-crystal plate 1 also varies with the position in the device accordingly. The resolution of the device does not directly depend on the distribution of charges developed corresponding to the written image in the vicinity of the interface between the single-crystal plate 1 and the insulating layer 2, but it is determined by the potential distribution which is created by the distribution of charges inside the single-crystal plate 1. On this account, in the thinner portion of the single-crystal plate 1 the potential distribution in the direction perpendicular to the thickness of the plate 1 spreads less, and hence resolution in this portion is high, whereas in the thicker portion of the single-crystal plate 1 the potential distribution spreads wider in the above-mentioned direction, and hence resolution is low. Thus, the conventional device structure has the defect of nonuniform resolution in the plane of the device. Moreover, since the image write sensitivity depends on the distribution of voltage throughout the single-crystal plate 1, nonuniformity in the thickness of the crystal may cause nonuniformity in the write sensitivity.

Furthermore, as will be seen from the above, it is desirable, from the viewpoint of improving the resolution of the device to reduce the thickness of the single-crystal plate 1, but under a restriction of the physical strength necessary for the fabrication and handling of the device, it is difficult to reduce the thickness of the single-crystal plate 1 to a value less than 100 μm.

Besides, it is desirable that the written image can be erased solely by voltage control, because this permits simplification of peripheral optical systems for applications of the device, but the conventional device requires, for erasure, the irradiation of uniform blue light as well as voltage control.

As described above, the prior art optical image device has shortcomings in terms of resolution, write sensitivity and erasure.

The spatial light modulator of the present invention employs the low dark resistance single-crystal plate 7 and the high dark resistance layer 8 in combination as described above with reference to FIG. 2, and hence is high in resolution and permits erasure of a written image by voltage control alone. Moreover, the present invention is intended to improve the afore-mentioned thin film type optical image device with a view to providing uniform in-plane resolution and write sensitivity.

EMBODIMENT

Figure 5:
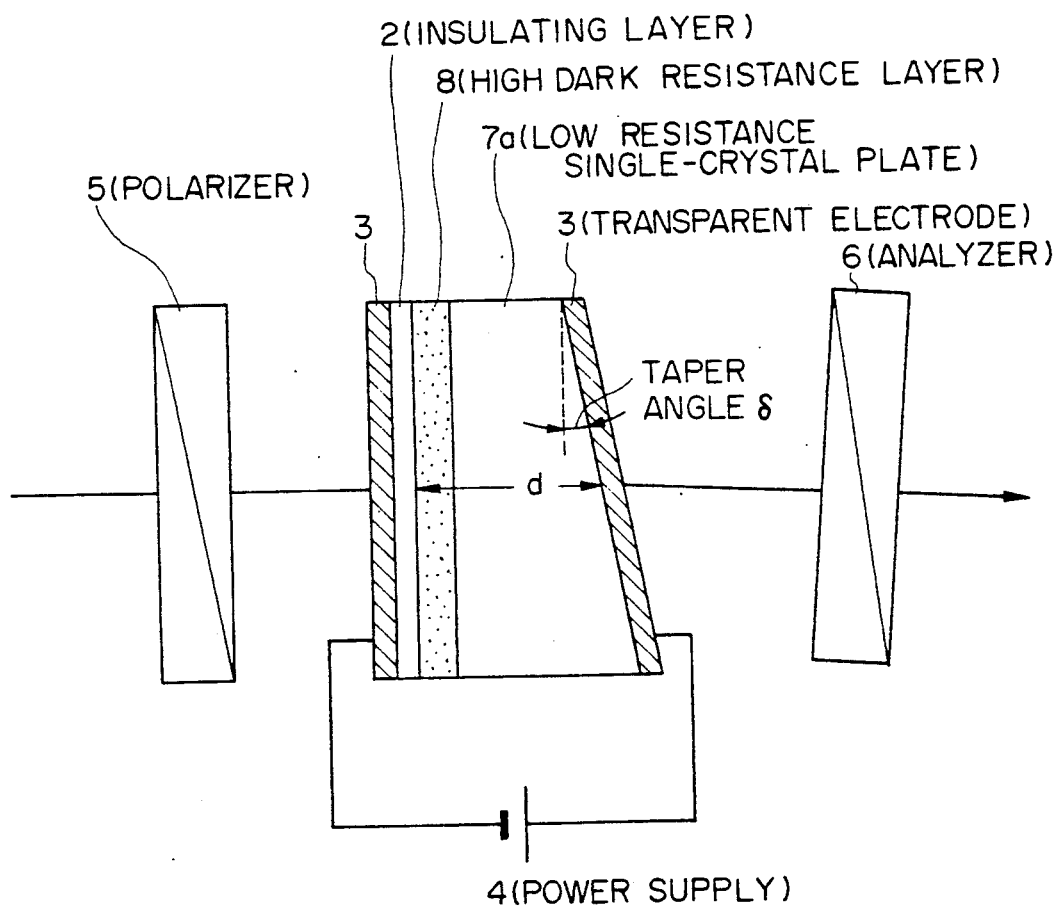
FIG. 5 is a diagram of the thin film type optical image device according to the present invention.

With reference to FIG. 5, the present invention will hereinafter be described in detail.

FIG. 5 schematically illustrates the structure of the spatial light modulator of the present invention, in which the low dark resistance single-crystal plate 7 of the sillenite type crystal structure, with its dark resistivity substantially reduced by the addition of phosphorus (P), is used as a low dark resistance single-crystal plate 7a with a tapered configuration.

In the conventional device the high dark resistivity single-crystal plate 1 is tapered for removing interference fringes due to multiple reflection, whereas in the present invention the low dark resistivity single-crystal plate 7 of the thin film type optical image device proposed in the afore-mentioned prior application is tapered. Incidentally, if the refractive index ($n_7$) of the low dark resistance single-crystal plate 7a and the refractive index ($n_8$) of the high dark resistance layer 8 differ largely from each other, interference fringes will be produced by multiple reflection in the high dark resistance layer 8 of a uniform thickness. In the present invention, however, since the refractive indexes of the sillenite type crystals such as $Bi_{12}MO_{20}$ (where M = Si, Ge, Ti) and phosphorus-doped $Bi_{12}MO_{20}$ are in the range of between about 2.2 and 2.6, the multiple reflection does not matter.

The taper angle δ needs only to be obtained from expressions (1) and (2) as in the prior art example, using as the center thickness d the sum of the thickness of the center of the low dark resistance single-crystal plate 7a (a mean value) and the thickness of the high dark resistance layer 8.

With the structure of the present invention in which the low dark resistance single-crystal plate 7a of the tapered configuration and the high resistance layer 8 are combined, voltage applied between the transparent electrodes 3 from the power supply 4 is divided mostly by the insulating layer 2 and the high dark resistance layer 8, because the resistivity of the low dark resistance single-crystal plate 7a is far lower than the resistivities of the insulating layer 2 and the high dark resistance layer 8. Consequently, in the thin film type optical image device of the present invention the low dark resistance single-crystal plate 7a serves as an electrode transparent to red light for readout operation and, at the same time, removes interference fringes due to multiple reflection, and voltage is applied uniformly to the high dark resistance layer 8 to form the distribution of charges corresponding to a written image in the single-crystal plate 7a as is the case with single-crystal plate 1 of the conventional device. Thus the write sensitivity and resolution can be made uniform throughout the device.

The low dark resistance single-crystal plate 7a and the high dark resistance layer 8 may be formed not only of $Bi_{12}SiO_{20}$ but also of other sillenite type crystals such as $Bi_{12}GeO_{20}$ and $Bi_{12}TiO_{20}$. The low dark resistance single-crystal plate 7a and the high dark resistance layer 8 need not always be of exactly the same composition but they may be formed of materials of the same crystal structure but different in composition, if their refractive indices are about the same.

Further, in the fabrication of the tapered low dark resistance single-crystal plate 7a a pentavalent element such as antimony (Sb) or niobium (Nb) may also be used in place of the phosphorus (P).

As described above in detail, according to the present invention, the tapered low dark resistance single-crystal plate 7a is used which is formed of $Bi_{12}MO_{20}$ (where M=Si, Ge, or Ti) or similar sillenite type crystal, doped with phosphorus (P) in the range of $0.03 \leq P \leq 0.2$ in atomic percentage ($0.99 \leq P \leq 6.6$ in molecular percentage) to provide a dark resistivity far lower than that of an undoped crystal, and the high dark resistance layer 8, which has the same crystal structure as that of the single-crystal plate 7a and produces the photoconductivity, and the electro-optic effect and a high dark resistivity, is provided on the light incident side of the single-crystal plate 7a, whereby the image write sensitivity and resolution can be made uniform throughout the device.

The use of $Bi_{12}MO_{20}$ (where M=Si, Ge, or Ti) for the high dark resistance layer 8 provides the photoconductivity, the electro-optic effect and the high dark resistivity in combination.

By forming the low dark resistance single-crystal plate 7a of a crystal of $Bi_{12}MO_{20}$ doped with pentavalent elements, it is possible to implement a low dark resistivity single-crystal plate of the sillenite type crystal structure.

By using the pentavalent element selected from the group consisting of phosphorus (P), antimony (Sb) and niobium (Nb), the dark resistivity of the single-crystal plate of the sillenite type crystal structure can be decreased.

By doping $Bi_{12}MO_{20}$ with phosphorus (P) in the concentration range of between 0.03 and 0.2 atm % (0.99 and 6.6 mol %), it is possible to obtain the low dark resistance single-crystal plate 7a of the sillenite type crystal structure with a markedly reduced dark resistivity.

Consequently, the thin film type optical image device of the present invention is of very wide application to the field of optical information processing such as the conversion of an incoherent to a coherent image, spatial frequency filtering, or optical logical operations. Hence, the present invention is of great utility in practical use.

What we claim is:

1. A spatial light modulator which performs recording and read-out of an optical image through utilization of photoconductivity and electro-optic effect of a single-crystal of a sillenite type crystal structure, characterized by:

a low dark resistance single-crystal plate of a sillenite structure having a low dark resistivity by impurity doping;

a high dark resistance layer provided on the light incident side of said low dark resistance single-crystal plate and higher in dark resistivity than said low dark resistance single-crystal plate, having sillenite structure lattice-matched to said low dark resistance single-crystal plate;

an insulating layer provided on the other side of said high dark resistance layer; and transparent electrodes provided on the other side of said high dark resistance layer; and transparent electrodes provided on the other side of said low dark resistance single-crystal plate and said insulating layer.

2. A spatial light modulator according to claim 1, characterized in that said high dark resistance layer is formed of $Bi_{12}MO_{20}$ (where M is Si, Ge, or Ti).

3. A spatial light modulator according to claim 1, characterized in that said low resistance single-crystal plate is formed of a crystal of $Bi_{10}MO_{20}$ (where M is Si, Ge, or Ti) doped with a pentavalent element.

4. A spatial light modulator device according to claim 3, characterized in that said pentavalent element is at least one of phosphorus (P), antimony (Sb) and niobium (Nb).

5. A spatial light modulator according to claim 3, characterized in that said low dark resistance single-crystal plate is formed of said $Bi_{12}MO_{20}$ doped with phosphorus (P) in the concentration range of between 0.03 and 0.2 atm %.

6. A spatial light modulator according to claim 1, characterzied in that said low dark resistance single-crystal plate has a tapered shape.

7. A spatial light modulator according to claim 1, characterized in that said high dark resistance layer is formed of $Bi_{12}MO_{20}$ (where M=Si, Ge, or Ti).

8. A spatial light modulator according to claim 6, characterized in that said low dark resistance single-crystal plate is formed of a crystal of $Bi_{10}MO_{20}$ (where M is Si, Ge, or Ti) doped with a pentavalent element.

9. A spatial light modulator according to claim 8, characterized in that said pentavalent element is at least one of phosphorus (P), antimony (Sb) and niobium (Nb).

10. A spatial light modulator according to claim 8, characterized in that said low dark resistance single-crystal plate is formed of said $Bi_{12}MO_{20}$ doped with phosphorus (P) in the concentration range of between 0.03 and 0.2 atm %.

* * * * *